May 10, 1927.
M. HIMMERICH
STOP COCK
Filed Feb. 5, 1926
1,627,974
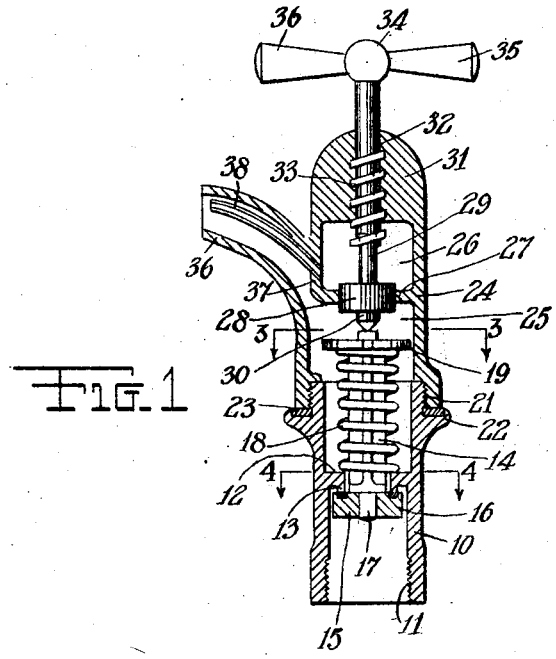
FIG. 1
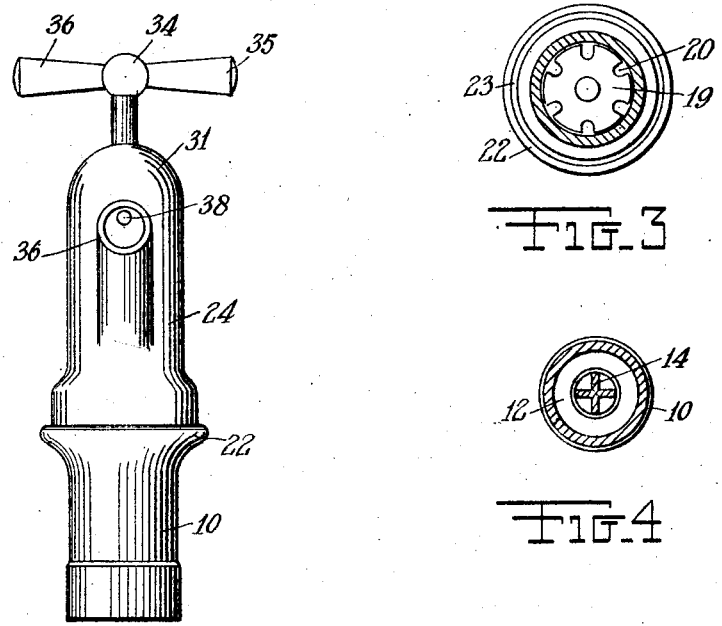
FIG. 2
FIG. 3
FIG. 4
INVENTOR
M. Himmerich
BY
ATTORNEY Patented May 10, 1927.

UNITED STATES PATENT OFFICE.

MAX HIMMERICH, OF NEW YORK, N. Y.

STOPCOCK.

Application filed February 5, 1926. Serial No. 86,134.

The main object of this invention is to provide a valve which is manually opened and mechanically closed upon release of rotative pressure on the operating stem. The valve is provided with a closure cap operated by a plunger. The plunger forms a separating element between the water circulating chamber and an additional chamber, which latter is sometimes filled by leakage of the water around the plunger. This additional chamber is drained by a tube which communicates therewith and thru a vacuum created by the outrush of the water thru the stem.

The above and other objects will become apparent in the description below, in which characters of reference refer to like-named parts in the drawing.

Referring briefly to the drawing, Figure 1 illustrates a longitudinal sectional elevational view of the valve.

Figure 2 illustrates a front elevational view of the valve.

Figure 3 is a cross sectional view, taken on line 3—3 of Figure 1.

Figure 4 is a cross sectional view, taken on line 4—4 of Figure 1.

Referring in detail to the drawing, the numeral 10 indicates a sleeve-like element. This sleeve is provided with internal threads 11 at its lower end thru which it is connected to piping. Intermediate the length of the sleeve in its bore, an annular internal flange 12 is formed. This flange has a central opening around which a ridge 13 is provided on its underside. A movable web post 14 reciprocates within the opening of the flange 12 and has affixed thereto at its lower end a disk 15 on the face of which a gasket 16 is embedded in such position that when the disk is in lifted position, the gasket will lie in contact with the annular ridge 13 and close the opening thru such contact. The means of coupling the movable post 14 to the disk 15 consists of a stud 17 forming part of the post 14 which is engaged in a hole formed in the disk 15. The post 14 extends upwardly over the flange 12 and has a spring 18 coiled upon it. This spring is held in place on the post by a washer 19. The opposing ends of the spring contact with the upper face of the flange 12 and the washer 19, respectively, and said spring, thru exerting upward pressure on the washer, lifts the post and all parts connected thereto and thereby causes the face of the disk 15 to engage the ridge 13. The washer is provided with radial channels 20 thru which channels the water or liquid passing thru the valve may freely circulate and not have its progress impeded. All the parts rigid with the post 14, including the disk 15 and washer 19, remain normally in lifted position unless downward pressure on the post is exerted. The upper end of the sleeve 10 is provided with an external thread 21 mounted above a shoulder 22 in which a gasket 23 is embedded. The lower end of a valve housing 24 is seated upon this gasket 23 and engages the threads 21. The valve housing is divided into a water circulating chamber 25 and an additional chamber 26 directly above the chamber 25, but divided therefrom by a horizontal wall 27 in which a relatively large opening exists. The surface of the opening in the dividing wall 27 forms a loose bearing for a plunger 28, which has a shank 29 rising from its upper face and a conical stud 30 extending downwardly from its lower face. The upper end of the housing 24 terminates in a solid block forming a hemi-spherical head 31 thru which an axial opening 32 passes. This opening 32 is provided with threads of relatively long pitch so that rotation of a threaded stem 33, which is engaged in the opening and projects above the head 31, may move the stem longitudinally downward a greater distance than if the stem were provided with the ordinary V threads of relatively small pitch. The stem 33 has a ball head 34 at its upper end from which arms 35 and 36 extend outwardly in diametrically opposite directions. The lower end of the stem engages and at all times lies in contact with the upper end of the shank 29. A curved spout 36 is provided and forms an integral part of the housing 24 communicating directly with the chamber 25 at a position where a portion 37 of the housing forms a wall between the chamber 26 and the bore of the spout 36. Within the bore of the spout, a tube 38 is fixed. This tube is mounted in the wall 37 of the housing and communicates directly with the chamber 26, serving as a channel thru which the liquid which may seep into the chamber 26, is exhausted or drained.

The valve is adapted to be automatically closed by the mechanism mounted within the housing 24 and sleeve 10. Said valve consists of a self-contained structure divided into two parts, a lower sleeve, in which parts are provided for closing circulation or flow of liquid, and an upper housing engaging the sleeve. The upper part or housing 24 may be removed without opening the flow of liquid so that parts therein may be replaced or renewed. The housing 24 is parted from the sleeve 10 by detaching the lower end of said housing thru unscrewing it from the threads 21. When so removed, the housing may have its parts, such as the stem 33 or plunger 28, replaced, or the siphoning tube 21 may be cleaned together with the chamber 26. In using the valve for tapping a pipe system, the stem 33 is rotated and by using square threads of steep pitch upon this stem, longitudinal movement is comparatively great with respect to a short rotational movement of the stem. The stem thru rotation is shifted downwardly and depresses the plunger 28 guided in the wall 27 by engaging the shank 29. This plunger is independent of the stem and is capable of being lifted by pressure of the coil spring 18 upon the washer 19. Lowering of the plunger causes the conical stud 30, which lies in engagement with the upper end of the post 14, to depress the latter and thru such depression, the disk 15 is lowered out of engagement with the first annular ridge 13 and permits liquid to flow around the disk thru the opening in the flange 12 and thence into the chamber 25 of the housing 24 to finally pass out of the housing thru the bore of the spout 36. As the liquid circulates into the chamber 25, part of it will, thru seepage around the plunger 28, enter the chamber 26. This liquid, if retained in this chamber, would cause the moving parts consisting of the plunger 28, to become corroded, thus interfering with the operation of the device. The water which may enter into the chamber 26 is drained thru the tube 28. This is accomplished by the rushing out of the liquid thru the bore of the spout 36, which liquid in passing thru the spout entirely envelopes the tube 38 and creates a vacuum in the outer end of said tube, causing a siphoning effect to be had in said tube, which effect drains the chamber 26 as this tubing is in direct communication with this chamber. When rotational pressure is released from the stem 33, the coil spring 18 mounted on the post 14 will react and lift the washer 19, the plunger 33, stud 30, and shank 29, and thru such lifting of these parts, the stem 33 is lifted a corresponding distance or until the disk 15 comes into contact with the annular ridge 13, closing the flow of liquid thru the valve.

I claim:—

In a stop cock, a self-closing valve comprising a sleeve adapted to be secured to piping, at one end, a housing having a spout removable secured to said sleeve at the other end, an annular flange inside said sleeve projecting toward the pipe end thereof, a web post passing through the opening in said flange, a disk rigid with said post on the pipe end thereof, a gasket embedded in said disk and adapted to contact with said annular flange, a channeled washer rigid with the other end of said post, a coiled spring surrounding said post and having its ends retained between said flange and washer, a threaded plunger rotatably mounted in said housing, a shank aligned with said plunger within the housing, a conical stud at the end of said shank lying in engagement with the washer on said post, said plunger upon rotation thereof causing said stud to force said washer and post toward the pipe end of the sleeve and simultaneously the disk away from said flange, said spring normally urging said disk against said flange to close the valve, the webs of said post and the channels of said washer being provided to lessen the obstruction of the device to the free flow of liquid, and said housing being removable from said sleeve without disturbing the normal closed position of the valve.

In testimony whereof I affix my signature.

MAX HIMMERICH.